United States Patent [19]

Siemon

[11] Patent Number: 4,620,296

[45] Date of Patent: Oct. 28, 1986

[54] PROTECTION SYSTEM FOR IMMUNIZING A CONTROLLED D-C POWER SUPPLY AGAINST A-C LINE VOLTAGE INTERRUPTIONS

[75] Inventor: Edward C. Siemon, Newfield, N.Y.

[73] Assignee: Dana Corporation, Toledo, Ohio

[21] Appl. No.: 676,146

[22] Filed: Nov. 29, 1984

[51] Int. Cl.$^4$ ...................... H02M 5/45; H02H 7/122
[52] U.S. Cl. ......................................... 363/51; 363/37; 361/92; 318/803
[58] Field of Search ........................ 363/35, 37, 51, 53, 363/54; 361/92; 318/799, 800, 801, 802, 803, 809

[56] References Cited

U.S. PATENT DOCUMENTS

| | | | |
|---|---|---|---|
| 3,784,846 | 1/1974 | Krick et al. | 307/293 |
| 3,950,675 | 4/1976 | Weber et al. | 317/13 A |
| 4,027,202 | 5/1977 | Tyler et al. | 361/33 |
| 4,060,841 | 11/1977 | Allen | 361/33 |
| 4,376,968 | 3/1983 | Wueschinski | 363/37 |

Primary Examiner—Peter S. Wong
Assistant Examiner—Judson H. Jones
Attorney, Agent, or Firm—James E. Tracy; Robert M. Leonardi

[57] ABSTRACT

When a d-c bus voltage is produced by rectifying applied a-c power line voltage in a rectifier bridge (such as a phase-controlled SCR rectifier bridge), controlled by a feedback loop which compares a feedback signal representing the d-c bus voltage with a command signal representing a desired set point level and from the comparison automatically maintains the bus voltage at the set point level, unwanted a-c line voltage interruptions may have a deleterious effect on the rectifier bridge itself and on a load driven by the bus voltage. This occurs because during a power interruption (when the bus voltage drops) the command signal causes the feedback loop to impose a control on the rectifier bridge which attempts to increase the d-c bus voltage back to the magnitude represented by the command signal. When power is subsequently restored, the d-c bus voltage will suddenly increase very sharply and may destroy electrical and/or mechanical components in the system. Immunization against the effects of the power interruptions is obtained by substituting the feedback signal for the command signal, during the occurrence of a power interruption, which will shut the rectifier bridge down and will force it to produce only a minimum amplitude d-c bus voltage when power is later restored. After power resumes, the rectifier bridge will be controlled by an acceleration regulating circuit so that the bus voltage gradually increases, at an adjustable rate, back up to the desired level set by the command signal.

9 Claims, 1 Drawing Figure

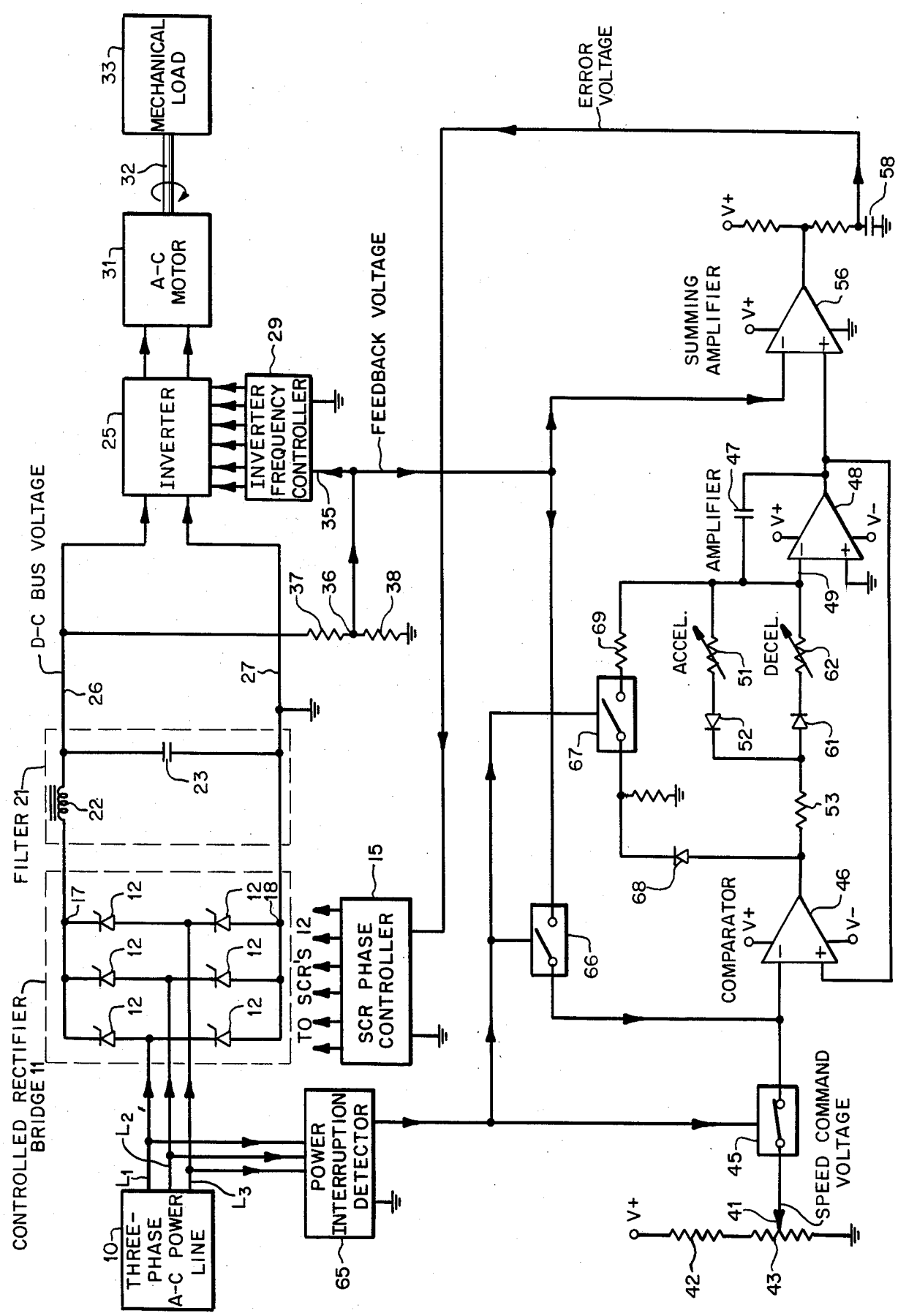

PROTECTION SYSTEM FOR IMMUNIZING A CONTROLLED D-C POWER SUPPLY AGAINST A-C LINE VOLTAGE INTERRUPTIONS

BACKGROUND OF THE INVENTION

This invention relates to a protection system for preventing damage to circuit and/or mechanical components, which are driven or powered by rectified a-c power line voltage, that may otherwise be caused by undesired line voltage interruptions.

A controlled rectifier bridge, usually followed by a low-pass filter, is customarily employed to produce, from a-c power line voltage, an adjustable amplitude d-c bus voltage for powering a load in accordance with the level of the d-c voltage. In one well-known arrangement, the conduction angle of the SCR's (silicon controlled rectifiers) in a phase-controlled SCR rectifier bridge, to which is applied a-c line voltage, is controlled to develop a d-c output bus voltage of a desired magnitude for application over a d-c bus to a load, such as an inverter-motor system, the inverter converting the d-c bus voltage to a-c voltage for driving the motor. The rectifier bridge is automatically controlled to maintain the d-c bus voltage at the desired level. This is achieved by a feedback loop which compares a feedback signal, representing the actual amplitude of the d-c bus voltage, with a set point or command signal representing the desired magnitude for the d-c bus voltage. The error signal, produced from the comparison, controls the conduction angle of the SCR's in the rectifier bridge so as to hold the d-c bus voltage at the desired amplitude despite load variations, namely changes in the current drawn by the motor. In this way if the mechanical load on the motor changes, the motor current (and thus the d-c bus current) will likewise change and this tends to vary the d-c bus voltage. However, the feedback loop automatically compensates and varies the error signal in order to change the conduction angle of the SCR's as necessary to stabilize the d-c bus voltage at the desired set point level.

Unfortunately, undesired power interruptions or outages present a problem when a rectifier bridge, which rectifies applied a-c power line voltage, is automatically controlled to maintain its output d-c voltage constant in the presence of load current changes. When a power interruption occurs the load continues to draw current from the d-c power supply (namely, the rectifier bridge and an associated filter, if used) even though the bridge no longer receives input a-c power. This load current will continue in a decaying fashion for a time determined by the energy storage capacity of the system. For example, if the controlled rectifier bridge is followed by a shunt-connected filter capacitor, decreasing current will be drawn from that capacitor. Since there is no power available from the a-c power line to maintain the d-c bus voltage, that voltage will collapse or drop. This appears as an increased load to the feedback loop and it tries to compensate by increasing the error signal which in turn increases the conduction angle of the SCR's in the rectifier bridge. The longer the line voltage interruption, the greater will be the conduction angle in an unsuccessful attempt to have the SCR's deliver more power from the a-c power line. When power does return, the SCR's are being commanded to conduct at a large conduction angle (almost if not wide open), resulting in a sudden increase in the d-c bus voltage and very high d-c bus current. This rapid change could damage, or even destroy, the SCR's in the rectifier bridge and/or circuit components in the electrical load, such as switching devices when the load includes an inverter. A motor driven by the inverter could also be damaged by the sudden changes in bus voltage and current. Moreover, the motor will rapidly speed up and mechanical components driven by or connected to the motor could break or fail.

This problem has now been overcome by the present invention. The disclosed protection system renders the controlled rectifier bridge immune to the deleterious effects of a-c line voltage interruptions so that no sudden changes will occur in the d-c bus voltage and bus current when power resumes, thereby preventing damage to electrical and mechanical elements.

SUMMARY OF THE INVENTION

The protection system of the present invention immunizes a controlled d-c power supply, which rectifies applied a-c power line voltage in a controlled rectifier bridge to develop a d-c bus voltage of a desired set point magnitude for driving a load, against the effects of unwanted a-c line voltage interruptions, the rectifier bridge being automatically controlled in response to a command signal representing the set point magnitude and a feedback signal representing the d-c bus voltage's actual magnitude to normally maintain the d-c bus voltage at the desired magnitude. The system comprises sensing means for detecting an interruption of the a-c power line voltage. Control means, controlled by the sensing means, controls the rectifier bridge only in response to the feedback signal during the occurrence of a power interruption so that the rectifier bridge will initially produce a minimum amplitude d-c bus voltage when power is restored. Acceleration regulating means, controlled by the sensing means, gradually increases the d-c bus voltage, at an adjustable rate, back up to the desired set point level after the power has been restored.

DESCRIPTION OF THE DRAWING

The features of the invention which are believed to be novel are set forth with particularity in the appended claims. The invention may best be understood, however, by reference to the following description in conjunction with the accompanying drawing which schematically illustrates an inverter-motor system driven by a controlled d-c power supply having a protection system constructed in accordance with one embodiment of the invention.

DESCRIPTION OF THE ILLUSTRATED EMBODIMENT

Referring now to the drawing, line conductors $L_1$, $L_2$ and $L_3$ connect a three-phase a-c power line or source 10, which may be the usual a-c power mains, to the input of a conventional phase-controlled SCR rectifier bridge 11 where a-c line voltage, received over the line conductors, is rectified and converted to a d-c voltage. The magnitude of the a-c power line voltage may take any appropriate value depending on the maximum d-c voltage required and the characteristics of the load to be driven. Rectifier bridge 11 has a family of six SCR's 12 arranged in three pairs, to each of which pairs is applied a respective one of the three phase voltages provided by a-c power line 10. The conduction angle of the six SCR's is controlled, by gating signals from SCR phase controller 15, in order to establish at the bridge's positive and negative output terminals (designated 17 and 18, respectively) a rectified voltage of a desired magnitude and in order to control the power supplied from a-c power source 10 and through bridge 11.

Filter 21, comprising series-connected choke 22 and shunt-connected capacitor 23, filter the rectified voltage from the bridge to develop a filtered d-c voltage for application to inverter 25 over the d-c bus provided by lines 26 and 27. A positive-polarity d-c bus voltage will therefore appear on line 26 with respect to line 27 which is connected to a ground plane of reference potential or circuit common, zero volts in the illustrated embodiment. Thus, by regulating the conduction angle of SCR's 12, the d-c bus voltage applied to inverter 25 may be adjusted.

Inverter 25 is of well-known construction, comprising six switching devices, such as SCR's or power transistors, that are controlled by periodically recurring triggering pulses received from inverter frequency controller 29. By applying the triggering pulses to the switching devices at prescribed times and in a prescribed sequence, the d-c bus voltage across the d-c bus 26, 27 is effectively changed to three-phase a-c voltage as applied to the windings of a-c motor 31, thereby delivering three-phase alternating current to the motor windings to effect rotation of the motor at a speed determined by and directly proportional to the frequency of the inverter output a-c voltage. The output shaft 32 of motor 31 drives some mechanical load 33. The construction of inverter frequency controller 29 required to produce triggering pulses for turning the switching devices in inverter 25 on and off in the correct sequence and at the correct times so as to provide the necessary three-phase a-c energy for rotating motor 31 and driving load 33 in the desired manner is well understood by those skilled in the art.

Input 35 of controller 29 connects to the circuit junction 36 of the voltage divider formed by resistors 37 and 38 so that the controller will operate in response to the d-c bus voltage, the pulse repetition frequency of the triggering pulses thereby being a function of (specifically directly proportional to) the d-c bus voltage. The voltage derived at junction 36 is referred to as the "feedback voltage", as indicated in the drawing, or the "feedback signal", and is a scaled-down or reduced-amplitude version of the d-c bus voltage, and thus is directly proportional to the bus voltage. For example, in one application of the invention where the d-c bus voltage is 560 volts, the feedback voltage is ten volts. By varying the frequency of the triggering pulses with d-c bus voltage changes, the amplitude and frequency of the inverter output voltage will vary in step and have a fixed ratio with respect to each other. A fixed ratio is desirable to avoid overheating of motor 31 and to provide the motor with a constant torque output capability regardless of motor speed.

To control the operation of SCR phase controller 15 to adjust the amplitude of the d-c bus voltage, and consequently the amplitude of the inverter output a-c voltage, and to control the operation of inverter frequency controller 29 to regulate the frequency of the inverter voltage, an adjustable set point d-c voltage is provided at the movable wiper 41 of potentiometer 43 which is in series with fixed resistor 42. As will be made apparent, the set point voltage from wiper 41 determines the steady state operating conditions and represents a desired amplitude and a desired frequency for the a-c voltage produced by inverter 25 for application to motor 31. Since the set point is usually selected to provide the speed required for mechanical load 33, the voltage at wiper 41 may appropriately be called the "speed command voltage", as indicated in the drawing, or the "speed command signal". Solid state switch 45 is normally closed, as shown, so under normal conditions the speed command voltage is applied to the inverting or (−) input of comparator 46.

When the entire system is initially turned on or energized to start the motor rotating, capacitor 47 will be discharged and the output voltage of amplifier 48 will be zero. Hence, at start-up the voltage at the non-inverting or (+) input of comparator 46 will also be zero. Since the voltage at the (−) input of amplifier 46 will now be greater than that at the (+) input, the comparator's output will be established at a relatively low voltage level or V−, which will assumed to be −15 volts d-c in the illustrated embodiment. This causes current to flow from input 49 of amplifier 48 and through accel adjustable resistor 51 (accel is an abbreviation of "acceleration"), diode 52 and fixed resistor 53 to the negative voltage at the output of comparator 46, the amount of the current being determined by the electrical size or resistance of resistors 51 and 53. Amplifier 48 and capacitor 47 function to conduct an equal amount of current from the output of amplifier 48 to capacitor 47 and back into input 49 in order to effectively cancel the current flowing from input 49 and through accel resistor 51, diode 52 and resistor 53. Input 49 will thus be at virtual ground potential. The current flowing to capacitor 47 charges the capacitor and since this charging current will essentially equal the current through resistor 51, diode 52 and resistor 53, the adjustment of resistor 51 will determine the charging rate.

As capacitor 47 charges up, the voltage at its right terminal and the output voltage of amplifier 48 will increase from zero in a positive direction. This positive-going voltage is applied to the non-inverting or (+) input of summing amplifier 56, the (−) or inverting input of which is connected to junction 36 of voltage divider 37, 38 to receive the feedback voltage. In effect, the voltage at the (+) input is added in summing amplifier 56, while the feedback voltage at the (−) input is subtracted. As a result, the output of amplifier 56 provides, across capacitor 58, an error voltage which is a function of the difference between the two applied voltages. At start-up the d-c bus voltage, and thus the feedback voltage, will be essentially zero so the increasing voltage at the (+) input of amplifier 56 develops an increasing error voltage. This positive-going error voltage is applied to SCR phase controller 15 which produces properly timed gating pulses for application to the gates of SCR's 12 in order to gradually increase the conduction angle of those SCR's so that a slowly increasing d-c bus voltage is provided. The feedback voltage likewise increases and causes controller 29 to increase the inverter frequency in step with the increasing bus voltage. Motor 31 therefore rotates and accelerates its speed in response to the increasing inverter frequency. Since the motor will speed up in accordance with the rate at which the d-c bus voltage increases, which in turn is determined by the charging rate of capacitor 47, the adjustment of accel resistor 51 dictates the acceleration rate of motor 31. In this way, the motor speed change can be made as smooth and as gradual as desired.

During the start-up process capacitor 47 continues to charge and the voltage at the (+) input of comparator 46 continues to increase in a positive direction. When that increasing voltage reaches the level of the command voltage at the comparator's (−) input, the output of comparator 46 will abruptly switch to V+ and will then alternately switch between V+ and V−, or between +15 volts and −15 volts, the average output voltage of comparator 46 thereby being zero. At this time charging of capacitor 47 ceases and the output voltage from the acceleration control circuit, namely the voltage applied to the (+) input of summing amplifier 56, will be equal to the command voltage at the (−) input of comparator 46. The SCR's 12 in rectifier bridge 11 will now operate with the conduction angle required to maintain the d-c bus voltage at the desired level and steady state conditions will prevail. With the system stabilized, the feedback voltage will be essentially equal to the command voltage.

The feedback loop now functions to automatically adjust the conduction angle of the SCR's 12 in the rectifier bridge so that the d-c bus voltage will be held at the set point magnitude needed to drive motor 31 at the selected desired speed, which is represented by the magnitude of the speed command voltage. If the d-c bus voltage tends to vary from the requisite steady state level for any reason, for example, due to a change in the mechanical load 33, the error voltage changes and causes phase controller 15 to automatically vary the conduction angle as necessary to adjust the d-c bus voltage until the correct steady state amplitude level is re-established and motor 31 is driven at the selected desired speed. For example, if the mechanical load increases resulting in the motor slowing down and a drop in the bus voltage, the feedback voltage decreases and this causes the error voltage to increase, thereby increasing the conduction angle of the SCR's 12 to bring the bus voltage back up to the required steady state or set point level, whereupon the motor speed returns to the desired speed. On the other hand, decreased load requirements and an increased bus voltage initiate automatic correction in the opposite sense, namely the error voltage decreases to decrease the conduction angle and return the bus voltage and motor speed to the desired levels.

If the load requirements change to the extent that a higher steady state motor speed is desired, potentiometer 43 may be adjusted to increase the speed command voltage as necessary to represent the new desired motor speed. Motor 31 will not immediately assume that new speed, however, because of the described acceleration regulating circuitry which will cause a gradual increase of the d-c bus voltage to the level required to drive the motor at the new speed. To explain, when the new higher command voltage is applied to the (−) input of comparator 46, the comparator's output switches to V−, or −15 volts d-c, since the voltage at the (−) input will now be greater than the old command voltage at the (+) input. Current will therefore flow from input 49 and through accel resistor 51, diode 52 and resistor 53 to the negative voltage at the output of comparator 46. Amplifier 48 and capacitor 47 will operate to conduct an equal magnitude of current into input 49 and this current charges capacitor 47 until the voltage at its right terminal, and the output voltage of amplifier 48, increase to the new command voltage, at which time both inputs of comparator 46 will be established at the same potential and the charging current will cease. In the meantime, as the voltage at the (+) input of summing amplifier 56 slowly increases to the new command voltage, the error voltage will likewise increase and enlarge the conduction angle to increase the d-c bus voltage as needed to drive the motor at the desired higher speed. When the new motor speed is established and the system is in equilibrium with new operating characteristics, the feedback loop will function as previously described to automatically hold the bus voltage and motor speed at their new set point levels.

In addition to providing regulated acceleration of the motor at an adjustable rate, controlled deceleration is also facilitated by the control system. When a lower motor speed is needed, potentiometer 43 is varied to decrease the command voltage. With a lower voltage at the (−) input of comparator 46, relative to the voltage at the (+) input, the comparator's output will switch to V+, or +15 volts d-c, causing current to flow from the output of comparator 46 and through resistor 53, diode 61 and decel (which, of course, is an abbreviation of "deceleration") resistor 62 to input 49. Once again, amplifier 48 and capacitor 47 function to produce current flow out of the charged capacitor 47, into the output of amplifier 48 and out of input 49 in an amount equal to that flowing through resistor 62 and into input 49, the two opposing currents thereby cancelling each other. Hence, the electrical size or resistance of resistors 62 and 53 determines the amplitude of the current drawn from capacitor 47 and consequently the rate at which the capacitor discharges and the rate at which the voltage decreases at the (+) input of summing amplifier 56. As that voltage drops, the error voltage decreases to reduce the conduction angle and lower the d-c bus voltage, as a result of which the motor slows down. When capacitor 47 discharges down to the lower command voltage and the motor reaches the new desired lower motor speed, the two inputs of comparator 46 will be equal and the current flow through resistor 62 terminates, causing the capacitor discharge current to cease. With the new set point conditions established, the control system will function to automatically maintain the motor speed at the new lower level.

Of course, while the motor speed may be changed by manually adjusting potentiometer 43, the speed command voltage may be derived by sensing some parameter or characteristic of the system, in which the controlled inverter-motor system is incorporated, in order to automatically control the motor speed in response to that sensed information.

It will therefore be appreciated that no matter how fast the command voltage is varied, the acceleration/deceleration regulating circuitry, as thus far described, ensures that the error voltage will always change slowly at a controlled rate, which is varied by adjusting resistors 51 and 62, so that smooth, controlled acceleration and deceleration of the motor will occur.

With the described circuitry, and in the absence of the invention, when an unwanted interruption occurs in the a-c line voltage after the system is stabilized and is in equilibrium, the voltage at the (+) input of summing amplifier 56 will remain at the command voltage while the feedback voltage at the (−) input drops since there no longer will be power available from the a-c power line 10 to maintain the d-c bus voltage as the motor 31 continues to rotate at a decreasing speed, using up energy stored in the motor and in the filter capacitor 23. The error voltage thus increases, as the d-c bus voltage decays, and commands the SCR's 12 to phase on with a larger and larger conduction angle in an unsuccessful attempt to have the SCR's supply more power from the power line to compensate for what appears to be an increased load. Meanwhile, motor 31 slows down and the d-c bus voltage continues to collapse. Depending on the time duration of the power interruption (for example, interruptions of up to five cycles of the a-c line voltage are very common) and depending on the "ride through" capacity of the system, namely the amount of stored energy that can be drawn upon during the interruption, when power is restored the SCR's 12 may be commanded to conduct at a very high, or even a full (wide open), conduction angle, resulting in a very rapid increase in d-c bus voltage and input current and a sudden speed up of the motor. These sudden changes could result in blown fuses, destruction of the SCR's 12 and the switching devices in inverter 25, damage to the motor 31 and damage to the mechanical load 33.

The invention provides, however, a protection system for immunizing the controlled d-c power supply (rectifier bridge 11 and filter 21) against the effects of unwanted a-c line voltage interruptions so that no sudden and damaging increases in bus voltage and bus current will occur when power returns. Turning now to the invention, power interruption detector 65, which may take any of several different well-known forms, serves as a sensing means for detecting an interruption of the a-c power line voltage, an interruption of either one, two, or all three phase voltages. In response to the detection of a power interruption, solid state switch 45 is opened and solid state switches 66 and 67 are closed by detector 65. The feedback voltage, which will be decreasing as the stored energy is consumed, will therefore be substituted for the command signal at the (−) input of comparator 46, causing the output of the comparator to switch to V+. Current therefore flows from the output of comparator 46 and through diode 68, switch 67, and resistor 69 to input 49. The resistance of resistor 69 will be very small compared to the lowest resistance of decel resistor 62 so that a substantial amount of current may flow through resistor 69 and into input 49 when switch 67 is closed. This current must be balanced out by an equal magnitude of current flowing out of the charged capacitor 47, into the output of amplifier 48 and out of input 49. Hence, capacitor 47 will be quickly discharged to the level of the feedback voltage and as that voltage continues to decay during the power interruption as the motor uses up the stored energy in the system and slows down, capacitor 47 continues to discharge so that the voltage at the (+) input of summing amplifier 56 will very closely track (namely will be equal to) the feedback voltage. With both of the inputs of amplifier 56 receiving the same voltage, a zero error voltage results and this reduces the conduction angle of the SCR's 12 to zero, thereby effectively turning the rectifier bridge 11 off. Thus, instead of phasing the SCR's full on during a power interruption, as would occur without the invention, the SCR's are phased all the way off.

When normal power conditions once again return, detector 65 closes switch 45 and opens switches 66 and 67. The command voltage will now be applied to the input of the acceleration/deceleration regulating circuit, namely to the (−) input of comparator 46, but the output of that circuit, namely the output voltage of amplifier 48, is still the feedback voltage since the output voltage cannot change instantly. As a consequence, the error voltage will remain at zero volts after power is restored and rectifier bridge 11 will initially produce a minimum amplitude (specifically zero) d-c bus voltage. In this way, rectifier bridge 11 is initially ineffective when power is resumed. Capacitor 47 now slowly charges up in the same manner as during a normal start-up and the voltage applied to the (+) input of summing amplifier 56 slowly increase from the feedback voltage to the command voltage to increase the error signal at a controlled rate, thereby gradually increasing the d-c bus voltage back up to the desired level. Thus, the motor accelerates at the normal acceleration rate, as determined by the adjustment of accel resistor 51, from its speed at the end of the power interruption to the speed set by the command signal with no sudden, uncontrolled speed changes and no failure of circuit and/or mechanical components.

Of course, voltages V+ and V− for operating the control logic are needed throughout a power interruption. The logic power supply must ride through a power interruption. If the low voltage is derived from power line 10, large power supply filter capacitors may be used to maintain the low voltage at the required levels until power is restored. Alternatively, entirely separate power sources may be used, such as a battery backup.

While a particular embodiment of the invention has been shown and described, modifications may be made, and it is intended in the appended claims to cover all such modifications as may fall within the true spirit and scope of the invention.

I claim:

1. A protection system for immunizing a controlled d-c power supply, which rectifies applied a-c power line voltage in a controlled rectifier bridge to develop a d-c bus voltage of a desired set point magnitude for driving a load, against the effects of unwanted a-c line voltage interruptions, the rectifier bridge being normally automatically controlled by control means in response to a command signal representing the set point magnitude and a feedback signal representing the d-c bus voltage's actual magnitude to normally maintain the d-c bus voltage at the desired magnitude, said protection system comprising:

sensing means for detecting an interruption of the a-c power line voltage;

said control means, controlled by said sensing means, controlling the rectifier bridge only in response to the feedback signal during the occurrence of a power interruption so that the rectifier bridge will initially produce a minimum amplitude d-c bus voltage when power is restored;

and acceleration regulating means, controlled by said sensing means, for gradually increasing the d-c bus voltage, at an adjustable rate, back up to the desired set point level after the power has been restored.

2. A protection system according to claim 1 wherein the d-c bus voltage decreases during the power interruption and wherein the control imposed on the rectifier bridge by said control means effectively turns the rectifier bridge off at the beginning of the power interruption and prevents a sudden increase of the bus voltage when power is restored.

3. A protection system according to claim 1 wherein the rectifier bridge is a phase-controlled SCR rectifier bridge having a plurality of SCR's, and wherein the conduction angle of the SCR's is reduced to zero by said control means during a power interruption to prevent a sudden increase of the bus voltage when power is restored.

4. A protection system for immunizing a controlled d-c power supply, which rectifies applied a-c power line voltage in a controlled rectifier bridge to develop a d-c bus voltage of a desired set point magnitude for driving a load, against the effects of unwanted a-c line voltage interruptions, the rectifier bridge being automatically controlled, to normally maintain the d-c bus voltage at the desired level, in response to an error signal produced by comparing a command signal, representing the desired set point magnitude for the d-c bus voltage, with a feedback signal representing the bus voltage's actual magnitude, said protection system comprising:

sensing means for detecting an interruption of the a-c power line voltage;

and control means, controlled by said sensing means, for effectively substituting the feedback signal for the command signal, during the occurrence of a power interruption, so that the resulting error signal causes the rectifier bridge to initially produce a minimum amplitude d-c bus voltage when power is restored.

5. A protection system according to claim 4 wherein the rectifier bridge is a phase-controlled SCR rectifier bridge having a plurality of SCR's whose conduction angle is controlled by the error signal, wherein the error signal is rapidly decreased to zero by said control means at the beginning of a power interruption to rapidly reduce the conduction angle of the SCR's to zero, and including acceleration regulating means, controlled by said control means, for slowly increasing the error signal after the power has been restored in order to gradually increase the d-c bus voltage back up to the desired set point level.

6. A protection system according to claim 4 and including acceleration/deceleration regulating means for normally preventing a sudden change in the error signal in the event of a sudden change in the command signal, and wherein the operation of said acceleration/deceleration regulating means is modified by said control means in order to rapidly change the error signal at the beginning of a power interruption so that the error signal will quickly turn the rectifier bridge off and render it initially ineffective when power is resumed.

7. A protection system according to claim 6 wherein said acceleration/deceleration regulating means includes a capacitor which, in response to an increased command signal, is charged slowly to develop a gradually increasing error signal and which, in response to a decreased command signal, is discharged slowly to develop a gradually decreasing error signal; and wherein said control means rapidly discharges said capacitor, at the beginning of a power interruption, to quickly reduce the error signal to zero so that the rectifier bridge will initially produce a minimum amplitude d-c bus voltage when power is restored; said acceleration/deceleration regulating means functioning, after power has been restored and in response to said command signal, to slowly charge said capacitor and increase the error signal so that the d-c bus voltage is gradually returned to its desired set point level.

8. A controlled d-c power supply for rectifying applied a-c power line voltage to develop therefrom a d-c bus voltage of a desired set point magnitude for application to a load, the a-c line voltage being subject to unwanted power interruptions, comprising:

a phase-controlled SCR rectifier bridge, having a plurality of SCR's, for rectifying the a-c line voltage to produce a d-c bus voltage of a magnitude determined by the conduction angle of the SCR's;

means for providing a command signal representing the desired set point magnitude for the d-c bus voltage;

comparison means for comparing the command signal with a feedback signal, representing the bus voltage's actual magnitude, to produce an error signal which is a function of the compared signals;

means, controlled by the error signal, for controlling the conduction angle of said SCR's in order to establish the d-c bus voltage at the desired amplitude level;

sensing means for detecting an interruption of the a-c power line voltage;

and means, controlled by said sensing means, for substituting the feedback signal for the command signal at the input of said comparison means, during the occurrence of a power interruption, to produce a zero error signal and reduce the conduction angle of said SCR's to zero so that the rectifier bridge will initially produce a minimum amplitude d-c bus voltage when power is restored.

9. In an inverter-motor system where a-c power line voltage is rectified in a phase-controlled SCR rectifier bridge, after which the rectified line voltage is filtered to develop, across a shunt-connected filter capacitor, an adjustable d-c bus voltage which is then converted by an inverter back to an a-c voltage for application to an a-c motor, a protection system for immunizing the inverter-motor system against the deleterious effects of unwanted a-c line voltage interruptions on the magnitude of the d-c bus voltage and on the speed of the motor, comprising:

means for providing a command signal;

means, responsive to said command signal, for controlling the SCR rectifier bridge and the inverter to establish the amplitude of the d-c bus voltage and the frequency of the a-c inverter voltage at desired steady state levels, the inverter frequency and motor speed being directly proportional to the magnitude of the bus voltage;

sensing means for detecting an interruption of the a-c power line voltage;

switching means, controlled by said sensing means, for effectively substituting for the command signal, during the occurrence of a power interruption, a feedback signal which is proportional to and represents the d-c bus voltage, the SCR rectifier bridge thereby being controlled so that a minimum amplitude d-c bus voltage will be initially produced when power is restored;

and acceleration regulating means, controlled by said sensing means, for slowly increasing the d-c bus voltage, and consequently the motor speed, back up to the desired levels after the power has been restored.

* * * * *